April 23, 1946.  G. R. GREENSLADE  2,399,018
TESTING DEVICE
Filed Jan. 19, 1943  4 Sheets-Sheet 1
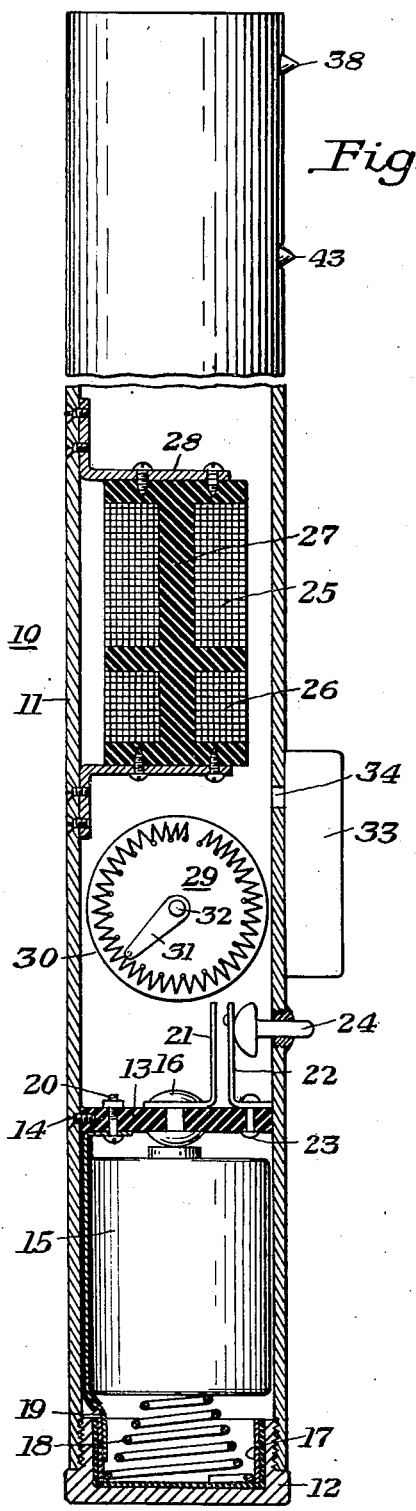
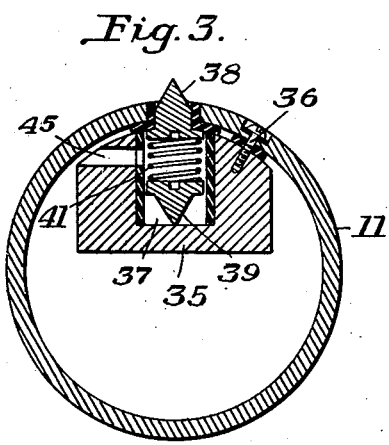
Inventor
Grover R. Greenslade
By Stebbins and Blenko
his Attorneys April 23, 1946.　　G. R. GREENSLADE　　2,399,018
TESTING DEVICE
Filed Jan. 19, 1943　　4 Sheets-Sheet 2

INVENTOR
Grover R. Greenslade
by his attorneys
Stebbins and Blenko

Inventor
Grover R. Greenslade
By Stebbins and Blenko
his Attorneys

April 23, 1946.   G. R. GREENSLADE   2,399,018
TESTING DEVICE
Filed Jan. 19, 1943   4 Sheets-Sheet 4

Inventor
Grover R. Greenslade
By Stebbins and Blenko
his Attorneys

Patented Apr. 23, 1946

2,399,018

UNITED STATES PATENT OFFICE 2,399,018

TESTING DEVICE

Grover R. Greenslade, Scott Township, Allegheny County, Pa., assignor to Flannery Bolt Company, Bridgeville, Pa., a corporation of Pennsylvania Application January 19, 1943, Serial No. 472,842

5 Claims. (Cl. 175—183)

This invention relates to the testing of hollow or tubular articles of electrically conducting material and, in particular, to the testing of such articles for the presence of hidden flaws or defects such as partial transverse fractures or the like.

Numerous hollow or tubular articles of metal are subjected to heavy stresses in service and it is highly important to know when such articles have defects which might make further use thereof a hazard to property and life. As example, hollow axles for railway rolling stock and particularly locomotives, locomotive crank pins and boiler staybolts may be mentioned. While various forms of testing devices have been proposed heretofore for such articles, the present invention utilizes a novel principle of operation and is highly effective in revealing the presence of dangerous defects in hollow metal articles.

In a preferred embodiment of the invention, I provide a testing device adapted to be inserted into the article to be tested. The device has spaced contacts projecting laterally therefrom adapted to engage the interior of the article and make electrical contact therewith. The device of my invention also includes a resistance element and resistor coils adapted to constitute a Wheatstone bridge with the portion of the article being tested between the contact points of the device as one of the four sides of the bridge. The testing device also includes a self-contained current source and a galvanometer. When the device has been initially inserted in the article to be tested, the bridge is balanced and the device is then caused to traverse the length of the interior of the article so that the contacts thereof engage the article at a succession of equally spaced points along the interior thereof. Since the resistance of the portion of the article between the contact points is increased upon the occurrence of a defect such as a transverse fracture therein, a definite indication on the galvanometer will be observed when the contact points embrace any such defect therebetween.

A more complete explanation of the device and its operation will be given during the following detailed description which refers to the accompanying drawings illustrating a preferred embodiment. In the drawings:

Figure 1 is a partial longitudinal section through the device of my invention with parts in elevation and parts shown diagrammatically;

Figure 3 is a transverse section through the device taken along the plane of line III—III of Figure 2;

Figure 2:
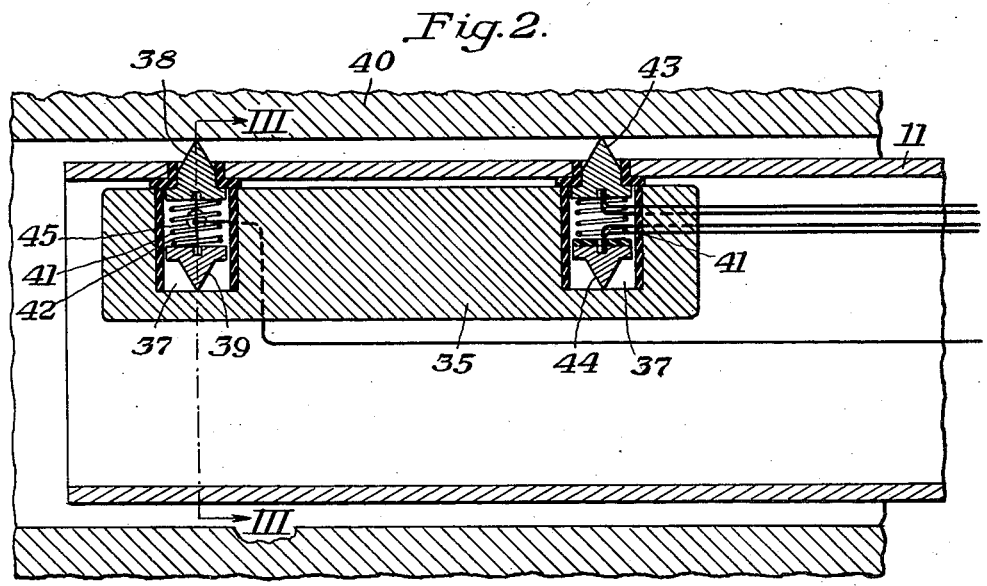
Figure 2 is a partial longitudinal section through the forward end of the testing device showing it in position within a hollow or tubular metal article to be tested.

Referring now in detail to the drawings and, for the present, to Figures 1 through 4, a testing device embodying my invention indicated generally at 10 comprises a tubular body or casing 11 having a removable closure 12 at its rear or handle end. The device 10 is of such size as to be readily insertible within the hollow or tubular articles to be tested. A disc 13 of insulation disposed transversely in the casing 11 and secured therein by screws 14 provides a chamber in the handle end of the device for a dry cell 15. A contact rivet 16 in the disc 13 is adapted to be engaged by the central terminal of the cell. The closure 12 has a conducting ring 17 therein separated by insulation from the closure itself. A spring 18 engaging the ring 17 holds the cell with its central terminal in contact with the rivet 16. A conducting strip 19 suitably insulated is secured to the ring 17 and extends upward through the cell chamber between the cell and the casing 11 to a terminal screw 20.

A control switch for the cell 15 is provided by a relatively fixed contact finger 21 held in place by the rivet 16 and a movable finger 22 secured to the disc 13 by a rivet 23. A push button 24 mounted in the wall of the casing 11 serves, when pressed, to actuate the finger 22 into engagement with the finger 21.

Resistor coils 25 and 26 are non-inductively wound on a spool 27 of insulation mounted on brackets 28 secured to the interior of the casing 11. The coil 25 is adapted to form one arm of a Wheatstone bridge. The coil 26 is adapted to form another arm in conjunction with a variable resistor 29 disposed on a disc 30 of insulation suitably secured within the casing. The resistor 29 includes a moving contact finger 31 secured to a shaft 32 extending radially through the wall of the casing and having a suitable operating knob (not shown) on the exterior thereof. A galvanometer 33 is mounted on the exterior of the device and the wall of the casing 11 is provided with an opening 34 for leads connected to the galvanometer.

A resistor element 35 in the form of a block of conducting metal is mounted in the forward end of the device being secured to the casing 11 by screws 36 but insulated therefrom. The element 35 is preferably a block of steel if the members to be tested are predominantly of that metal as will usually be the case. Holes 37 near the ends of the block 35 are each provided with a pair of contact points. The hole 37 nearer the forward end of the device has contacts 38 and 39 therein adapted to engage, respectively, the interior of an article to be tested shown at 40 and the bottom of the hole 37. A spring 41 normally tends to urge the contact points apart and into engagement with the surfaces just mentioned. An insulating bushing and washer separate the contact 38 from the casing 11 and a bushing similarly prevents engagement of the contact 39 with the block 35 except at the extremity of the former. The contact points 38 and 39 are connected by a slack wire jumper 42.

The hole 37 in the block 35 remote from the forward end of the device is similarly provided with contact points 43 and 44. A disc of insulation separates the spring 41 from the contact point 44. By virtue of the construction described, it will be apparent that the contact points 38 and 43 are adapted to have yielding engagement with the interior of the article 40 when the device 10 is inserted therein.

Figure 4:
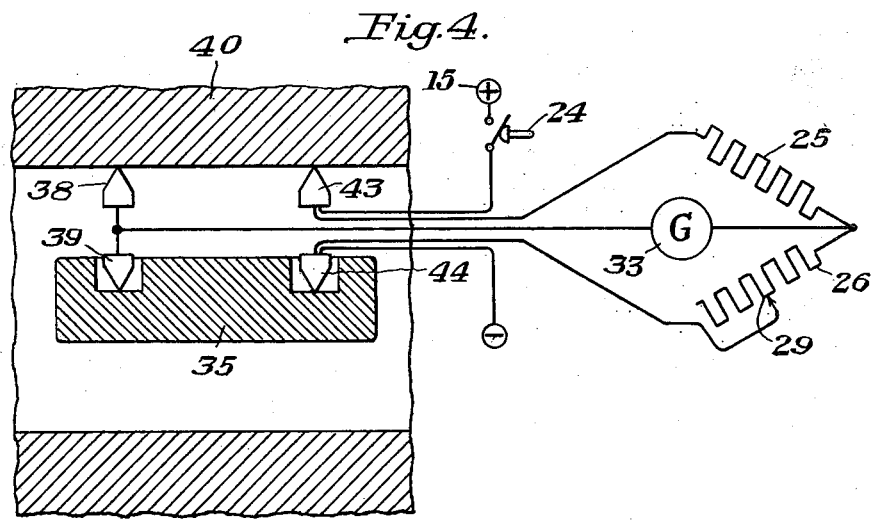
Figure 4 is a diagram showing the circuit in which the various parts of the device are connected to form a Wheatstone bridge with a portion of the article being tested as the fourth arm thereof.

Figure 4 illustrates the circuit in which the various parts of the device are connected. The connecting leads have been omitted from Figures 1 and 2, for the sake of clearness. It will be apparent that in the circuit of Figure 4, the coil 25 forms one side of a Wheatstone bridge while the coil 26 plus the variable resistor 29 forms another side. The block 35 forms still another side and the contacts 38 and 43 are so connected that the portion of the article 40 therebetween constitutes the fourth side. It is evident that the circuit will be energized from the cell 15 on actuation of the push button 24. Thus when the device 10 has been initially inserted into the article to be tested, the bridge may be balanced by adjusting the resistor 29 so that the galvanometer 33 shows no deflection. When this has been done, the testing device is moved bodily along the article with the contact points 38 and 43 in constant engagement with the interior thereof. Should the article have a defect therein such as a transverse fracture which would affect the electrical resistance of the neighboring portion of the length of the article, this will be immediately indicated by an unbalancing of the bridge when the contact points 38 and 43 are on opposite sides of the fracture. A definite indication is thus obtained of the presence of any defect or flaw such as a fracture which would increase the resistance of the article when measured longitudinally. The resistance of the block 35 is preferably of the same general order as the resistance of that portion of the article between points 38 and 43.

Figure 2 illustrates how the leads are connected to the contact points 38, 39, 43 and 44. To permit such connections, holes 45 are drilled into the block 35 and through the insulating bushings, intersecting the holes 37.

Figure 5:
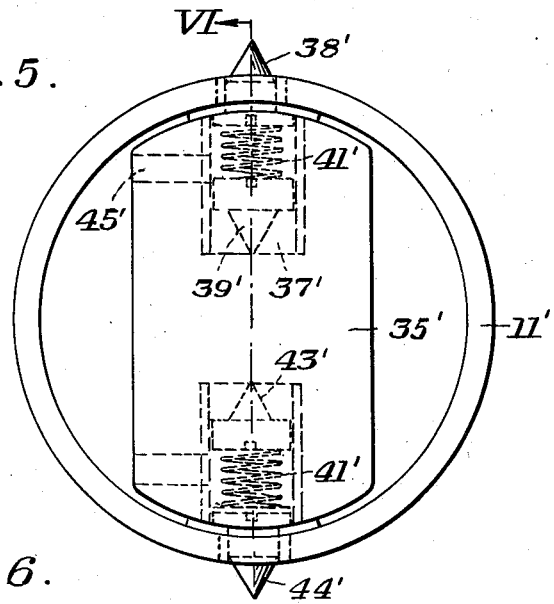
Figure 5 is an end elevation of a modified form of device.
Figure 6:
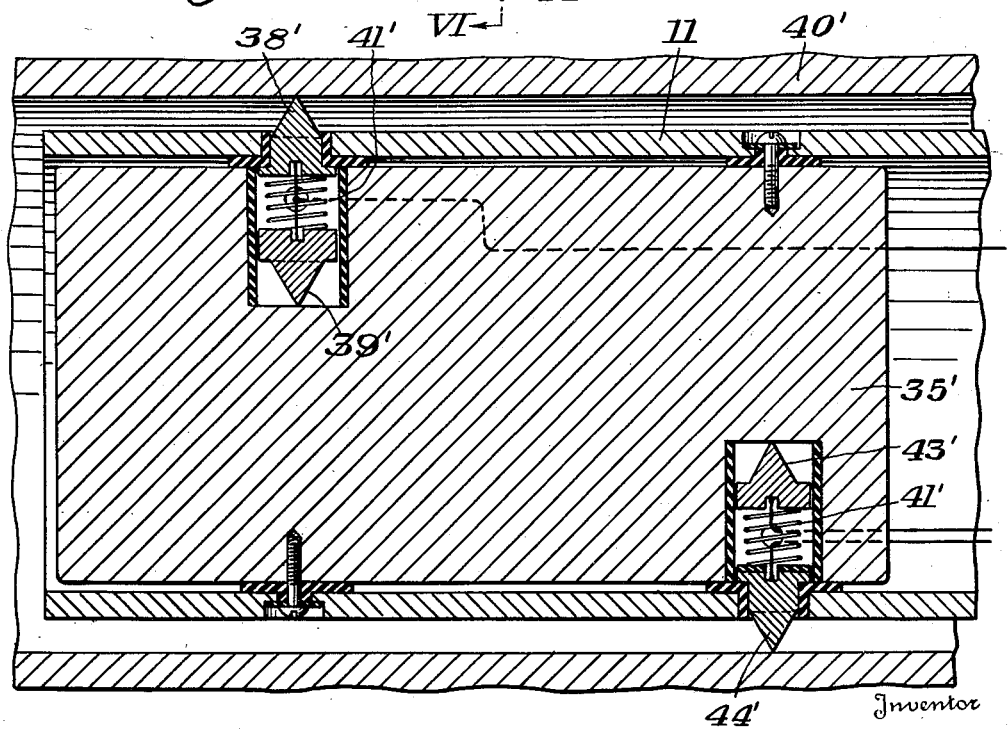
Figure 6 is a longitudinal section therethrough taken along the plane of line VI—VI of Figure 5, showing the device in position within an article to be tested.

Figures 5 and 6 illustrate a modified form of device which is generally similar to that already described and the corresponding parts thereof are designated by similar reference numbers with a prime attached. The principal difference between the two modifications is in the shape of the resistor elements 35 and 35'. The latter is shaped to extend across the full diameter of the casing 11'. A further change is the location of contacts 43' and 44' diametrically opposite from the points 38' and 39'. This permits the device to reveal the presence of a defect regardless of its angular location about the axis of the bore through the article being tested. The device of Figures 1 through 3, obviously, will reveal the presence only of defects which are more or less in alignment with the positions of the contact points. This is advantageous where it is desirable to locate the angular relation of the defect as well as its position along the length of the article being tested. While an article may be completely tested with the device of Figures 1 through 3 by making several passes of the device through the article in different angular relations, the device of Figures 5 and 6 will reveal any defect, regardless of its location about the axis of the bore, on a single pass of the device through the article. The mode of manipulation of the modified device and the functioning thereof are the same as have already been described with reference to Figures 1 through 4. In both forms of the invention, the use of contact points engaging the resistor element compensates for the contact resistance between the article being tested and the contact points engaging therewith. This eliminates errors which might otherwise be mistaken for indications of defects.

Figure 7:
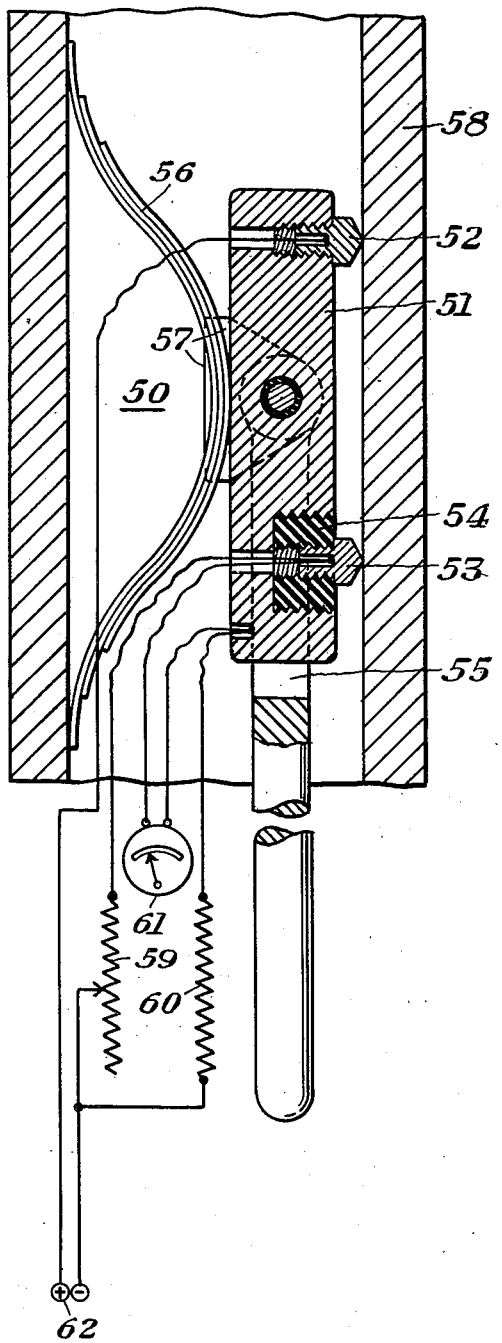
Figure 7 is a longitudinal sectional view through a further modified form of testing device showing it in position within an article to be tested.
Figure 8:
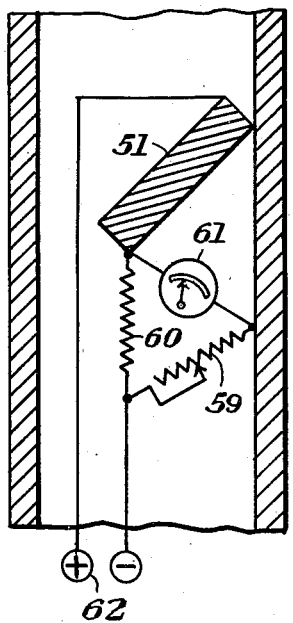
Figure 8 is a simplified diagram illustrating how the circuits shown in Figure 7 form a Wheatstone bridge with a portion of the article being tested as the fourth arm.

Figure 7 illustrates a further modified form of testing device indicated generally at 50. This form of device comprises a resistor block 51 having contact points 52 and 53 secured thereto, the former being in contact with the block and the latter being insulated therefrom by a bushing 54. The block 51 is pivotally mounted in a yoke 55 having a handle formed thereon. A leaf spring 56 secured to the block by a shackle 57 is adapted to engage the interior of the article being tested indicated at 58 on one side and urge the points 52 and 53 into engagement with the article on the other side of the interior thereof. A variable resistor 59, a fixed resistor 60 and a galvanometer 61 are connected in the form of a Wheatstone bridge, as shown in Figure 8, with the element 51 as the third arm and the portion of the article 58 between the points 52 and 53 as the fourth arm. The resistors 59 and 60 and the galvanometer 61 may conveniently be mounted in a suitable case and connected by flexible leads, as shown, to the block 51 and points 52 and 53. The case for the resistors and galvanometer may also include a current source such as a dry cell 62.

Figure 7 shows the actual circuit connections but Figure 8 shows a schematic diagram thereof from which the existence of the Wheatstone bridge may be more readily observed, corresponding parts being similarly numbered in both figures. It will be noted that contact point 52 at one end of the block 51 is connected directly to the positive terminal of the dry cell 62 in both figures and that leads from the resistor 60 and galvanometer 61 are connected to the other end of the block 51. Similarly, the contact point 53 makes connection to the interior of the article 58 for leads from the resistor 59 and the galvanometer 61. It will thus be apparent that the resistors 59 and 60 form two adjacent arms of the bridge while the block 51 forms the third arm and the portion of the article between contact points 52 and 53 constitutes the fourth arm. With this explanation, it will be understood that the device of Figure 7 functions in the same manner as those already described to produce an indication on the galvanometer when the portion of the article being tested embraced between the contact points has a defect therein such as to increase its electrical resistance as compared to a sound portion of the article.

It will be apparent from the foregoing description and explanation that the invention provides an improved device for testing tubular or hollow articles of electrically conducting material such as metal. The accuracy of the Wheatstone bridge for resistance measurement is well understood and the device of my invention applies its high sensitivity to the testing of hollow articles with the result that even exceedingly small flaws or fractures may be detected before they reach such proportions as dangerously to impair the strength of the articles wherein they occur.

Although I have illustrated and described but a few forms of the invention, it will be recognized that changes in the construction and arrangement of the parts may be made without departing from the spirit of the invention or the scope of the appended claims.

I claim:

1. A testing device for articles composed of electrically conducting material comprising a member adapted to be disposed in cooperative relation with the article, a pair of contacts projecting from said member adapted to engage spaced points on the article when in such relation thereto, a conducting block secured to said member having a resistance of the same general order as the portion of the article between said contacts, a second pair of contacts similar to the first-mentioned contacts spaced along and engaging said block, yielding means urging said first-mentioned contacts outwardly from said member for engagement with the article and said second-mentioned contacts against said block under substantially the same pressure, a pair of resistors mounted on said member, one of said resistors including a variable portion, said resistors being connected to form adjacent sides of a Wheatstone bridge, said first-mentioned pair of contacts being connected to the ends of the third side of the bridge, said second-mentioned pair of contacts being connected to the ends of the remaining side of the bridge, a galvanometer on said member connected between two opposite corners of the bridge and connections from the remaining corners of the bridge to a current source.

2. The apparatus defined by claim 1 characterized by said contacts of said first-mentioned pair being spaced along said member and projecting therefrom in different directions.

3. A device for testing hollow articles of electrically conducting material comprising a member adapted to be inserted into said articles, contacts spaced along said member, projecting therefrom and adapted to engage the interior of the articles when said member is inserted therein, a conducting block secured to said member but insulated therefrom, a second pair of contacts similar to the first-mentioned contacts spaced along and engaging said block, yielding means urging said first-mentioned contacts outwardly from said member for engagement with the article and said second-mentioned contacts against said block under substantially the same pressure, a pair of resistors adjacent said member, one of said resistors including a variable portion, said resistors being connected to form adjacent sides of a Wheatstone bridge, said first-mentioned contacts being connected to the ends of the third side of the bridge, said second-mentioned contacts being connected to the ends of the remaining side of the bridge, a galvanometer on said member connected between two opposite corners of the bridge, and connections from the remaining corners of the bridge to a current source.

4. A device for testing hollow articles of electrically conducting material comprising a resistance member adapted to be inserted into said articles, a pair of contacts mounted on said member in spaced relation, projecting therefrom and adapted to engage the interior of the articles when said member is inserted therein, said member having an electrical resistance of generally the same order as that portion of the article between said contacts, a second pair of contacts similar to the first-mentioned contacts carried by and engaging said member, common means for urging one contact of the first pair outwardly of said member and one contact of the second pair against said member, similar means for urging the remaining contacts outwardly of and against the member, respectively, a pair of resistors including a variable portion, said resistors being connected to form adjacent sides of a Wheatstone bridge, said first-mentioned contacts being connected to the ends of the third side of the bridge, said second-mentioned contacts being connected to the ends of the remaining side of the bridge, a galvanometer connected between two opposite corners of the bridge and connections from the remaining corners of the bridge to a current source.

5. A testing device as defined by claim 4 characterized by said means comprising back-up springs each engaging one of said first-mentioned pair of contacts and one of said second pair of contacts, whereby the contact resistance between said member and said second pair of contacts compensates substantially for the resistance between the first-mentioned pair of contacts and the article.

GROVER R. GREENSLADE.